(12) United States Patent
Carr et al.

(10) Patent No.: US 7,937,998 B2
(45) Date of Patent: May 10, 2011

(54) SENSOR MOUNT WITH SELF-TIGHTENING DEVICE

(75) Inventors: William L. Carr, Bettendorf, IA (US); Carl Starkey, Clinton, IA (US)

(73) Assignee: Deere & Company, Moline, IL (US)

( * ) Notice: Subject to any disclaimer, the term of this patent is extended or adjusted under 35 U.S.C. 154(b) by 159 days.

(21) Appl. No.: 12/407,632

(22) Filed: Mar. 19, 2009

(65) Prior Publication Data
US 2010/0238011 A1    Sep. 23, 2010

(51) Int. Cl.
*G01M 17/02*    (2006.01)
(52) U.S. Cl. ......................................................... 73/146
(58) Field of Classification Search .................. None
See application file for complete search history.

(56) References Cited

U.S. PATENT DOCUMENTS

| | | |
|---|---|---|
| 4,235,184 A | 11/1980 | Schiavone |
| 4,487,154 A | 12/1984 | Daly et al. |
| 4,510,484 A | 4/1985 | Snyder |
| 4,783,993 A | 11/1988 | Lothar et al. |
| 4,954,677 A | 9/1990 | Alberter et al. |
| 5,035,137 A | 7/1991 | Burkard et al. |
| 5,063,774 A | 11/1991 | Burkard et al. |
| 5,559,484 A | 9/1996 | Nowicki et al. |
| 5,844,131 A | 12/1998 | Gabelmann et al. |
| 6,055,855 A | 5/2000 | Straub |
| 6,549,125 B2 | 4/2003 | Nigon et al. |
| 6,655,203 B2 | 12/2003 | Hsu |
| 6,672,150 B2 | 1/2004 | Delaporte et al. |
| 6,694,807 B2 | 2/2004 | Chuang et al. |
| 6,805,000 B1 | 10/2004 | Sheikh-Bahaic |
| 7,082,817 B1 | 8/2006 | Yu et al. |

OTHER PUBLICATIONS

Background Information (2 pages)(Prior Art).
Bendix SmartWave Tire Pressure Monitoring System (81 pages)(prior art).
Bridgestone Wireless Tire Pressure Monitoring System (1 page)(Jul. 2008).
Kilometer Magazine Forums (29 pages)(2005-2006).
Drawings of Tire Condition Sensor Unit (1 page)(prior art).

*Primary Examiner* — Andre J Allen

(57) ABSTRACT

A wheel assembly comprises a wheel, a tire mounted to the wheel, a tire condition sensor unit, and a sensor mount. The sensor mount mounts the sensor unit to an outside diameter surface of a rim of the wheel in a desired circumferential mounting location relative to the wheel, and comprises an endless loop self-tightening device positioned around the wheel.

4 Claims, 5 Drawing Sheets

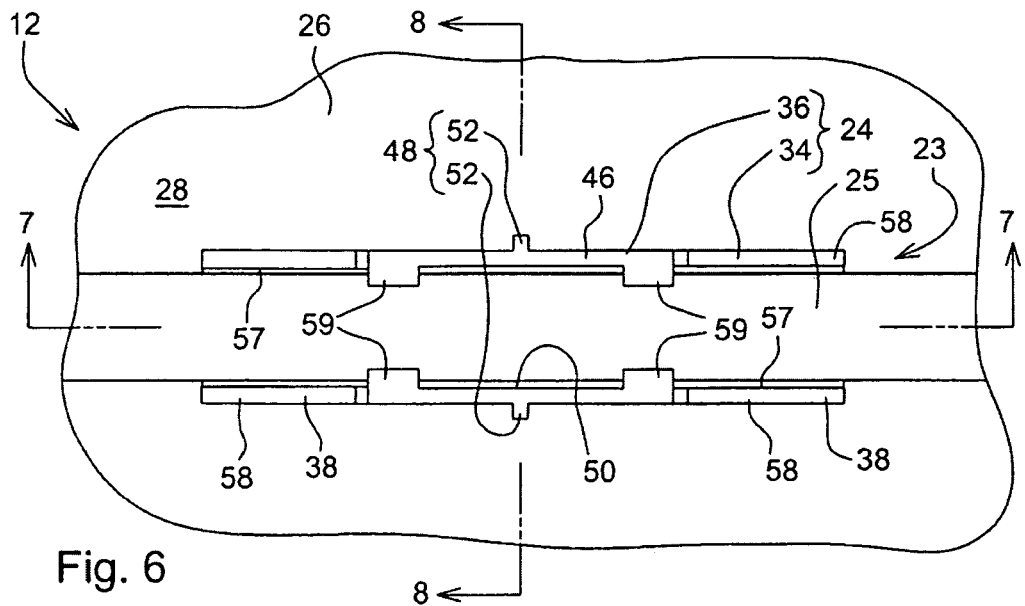
Fig. 6
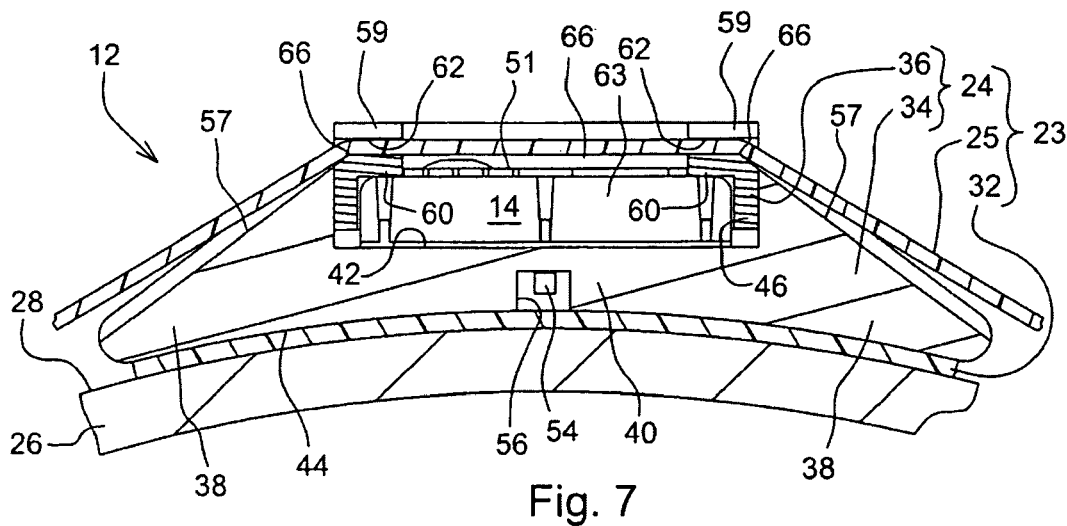
Fig. 7
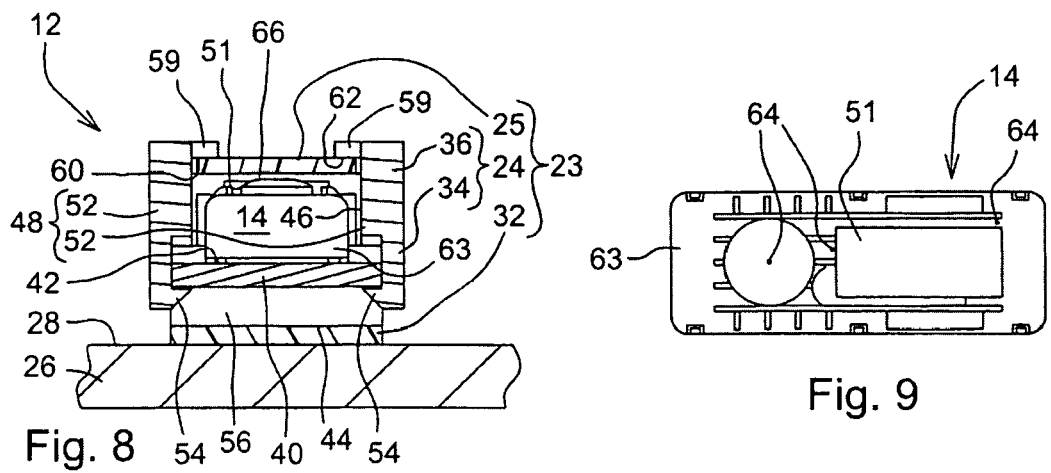
Fig. 8
Fig. 9

SENSOR MOUNT WITH SELF-TIGHTENING DEVICE

FIELD OF THE DISCLOSURE

The present disclosure relates to a wheel assembly, and, more particularly, to mounting a tire condition sensor to a wheel of the wheel assembly.

BACKGROUND OF THE DISCLOSURE

There are prior art vehicles which have a number of wheel assemblies, each with a tire condition sensor unit located inside the wheel assembly and mounted to the wheel to detect pressure and temperature inside the tire. Such a sensor unit is used with a tire monitoring system on board the vehicle.

SUMMARY OF THE DISCLOSURE

According to the present disclosure, there is provided a wheel assembly comprising a wheel, a tire mounted to the wheel, a tire condition sensor unit, and a sensor mount. The sensor mount mounts the sensor unit to an outside diameter surface of a rim of the wheel in a desired circumferential mounting location relative to the wheel, and comprises an endless loop self-tightening device positioned around the wheel.

The self-tightening feature of the self-tightening device facilitates mounting the sensor unit to the wheel and helps to keep the sensor unit at least very close to the desired circumferential mounting location. It grips the wheel automatically, simplifying installation of the sensor unit. Further, the self-tightening device remains tight during use and vibration of the wheel assembly, so that the sensor unit stays in place or at least very near thereto during the useful life of the self-tightening device.

The above and other features will become apparent from the following description and the attached drawings.

BRIEF DESCRIPTION OF THE DRAWINGS

The detailed description of the drawing refers to the accompanying figures in which:

FIG. 6 is a top plan view of the arrangement of FIG. 5;

FIG. 7 is a sectional view taken along lines 7-7 of FIG. 6;

FIG. 8 is a sectional view taken along lines 8-8 of FIG. 6; and

FIG. 9 is a top plan view of the sensor unit.

DETAILED DESCRIPTION OF THE DRAWINGS

Figure 1:
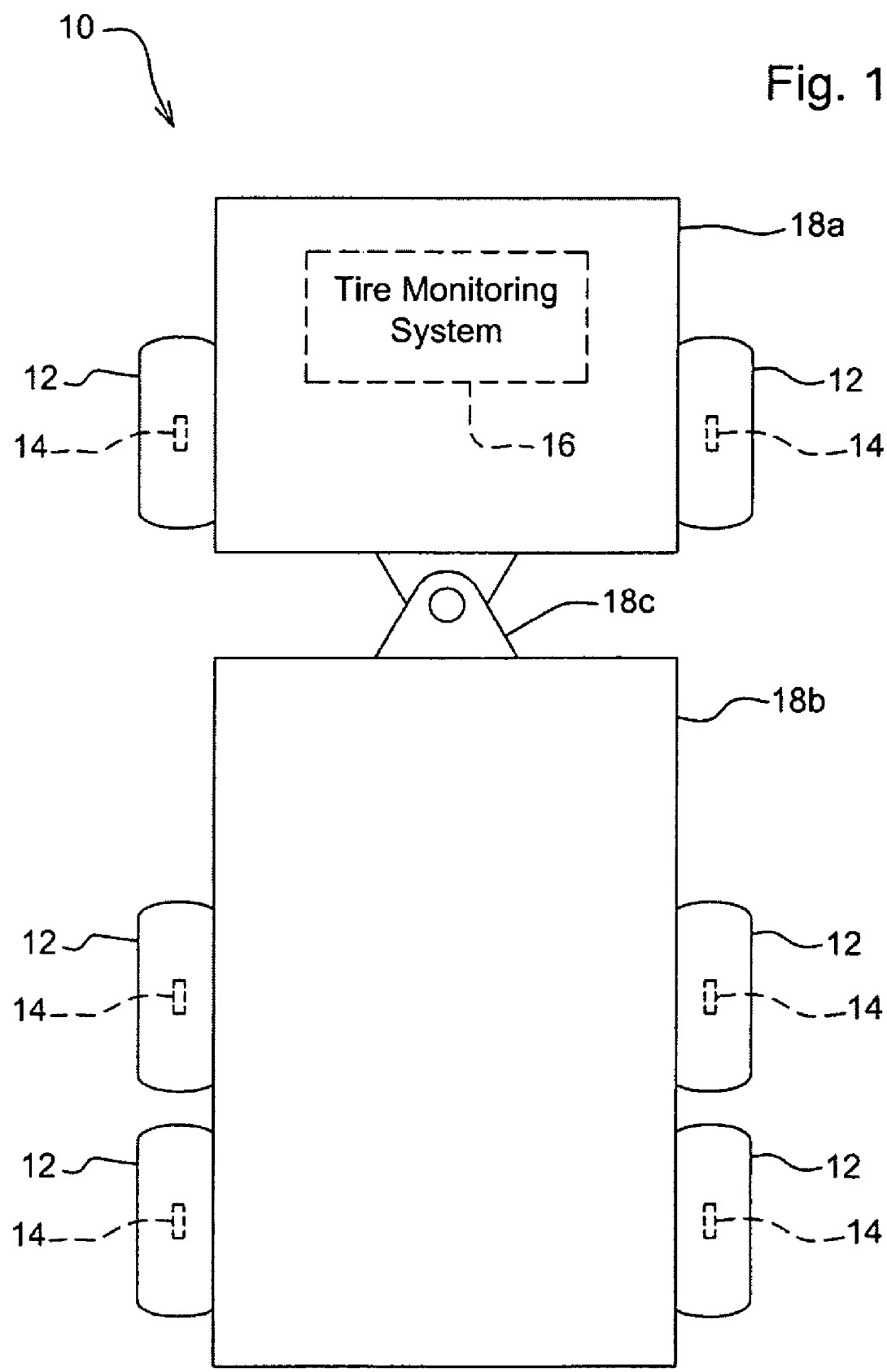
FIG. 1 is a diagrammatic view of a vehicle, such as, for example, an articulated dump truck, having a tire monitoring system with a sensor unit at each wheel assembly for detecting one or more tire conditions.

Referring to FIG. 1, there is shown a diagrammatic view of a vehicle 10 having a number of ground-engaging wheel assemblies 12. Each wheel assembly 12 may have a tire condition sensor unit 14 mounted inside the wheel assembly 12. The sensor unit 14 is adapted to detect at least one condition inside the tire of the wheel assembly 12 (e.g., pressure and temperature) and is adapted to send that condition information wirelessly to a tire monitoring system 16 integrated into the vehicle 10 through, for example, CAN (i.e., Controller Area Network), which monitors, for example, tire pressure and for overheating of each tire.

The vehicle 10 may be a heavy duty off-highway vehicle such as, for example, an articulated dump truck, having front and rear sections 18a, 18b articulated to one another at an articulation joint 18c for articulated steering, with two wheel assemblies 12 included in the front section 18a and four wheel assemblies 12 included in the rear section 18b. In other embodiments, the vehicle 10 may be any other type of wheeled vehicle where tire condition monitoring may be useful.

The sensor unit 14 may be adapted as a single sensor or may include two or more sensors. Exemplarily, the sensor unit 14 has a pressure sensor and a temperature sensor, and both sensors are contained in a housing 63 of the sensor unit 14. In such a case, the pressure sensor detects the pressure inside the tire, and the temperature sensor detects the temperature inside the time. The sensed temperature may be used to perform a temperature compensation calculation on the pressure reading and may also be used to notify of an overheated condition. The housing 63 has small openings 64 (e.g., three) (see FIG. 9) formed therein allowing exposure of the internal sensors to the region outside the housing 63 and thus to pressure and temperature inside the tire. The side of the sensor unit 14 with these openings 64 is the operational portion of the sensor unit 14. Such a sensor unit 14 may be referred to as a sensor capsule. An example of such a sensor unit 14 is part number 200.0176 of SmarTire Systems Inc. of Richmond, British Columbia, Canada.

During calibration, the tire monitoring system 16 learns the identity of each wheel assembly 12 to be monitored. A person approaches each wheel assembly 12 and holds a communication device (e.g., a maintenance hand tool) near a circumferential location about the wheel assembly 12 where the person thinks the sensor unit 14 may be located, such as near the valve stem 21. The communication device wirelessly pings the sensor unit 14 (i.e., requests its identification code), which responds by wirelessly transmitting its identification code to the communication device. The identification codes of the wheel assemblies 12 are then loaded into a memory of a controller of the tire monitoring system 16 for use thereby.

During use of the tire monitoring system 16, in the case where the sensor unit 14 has a pressure sensor and a temperature sensor, each sensor unit 14 detects the pressure and temperature inside the associated tire and sends that condition information wirelessly to a receiver on board the vehicle 10. A controller receives the pressure and temperature information from the receiver via CAN, and determines whether that information satisfies predetermined criteria, relating, for example, to tire inflation pressure and tire overheating. The controller signals a display to warn a human operator of the vehicle 10 of low tire pressure or an overheated tire.

Figure 2:
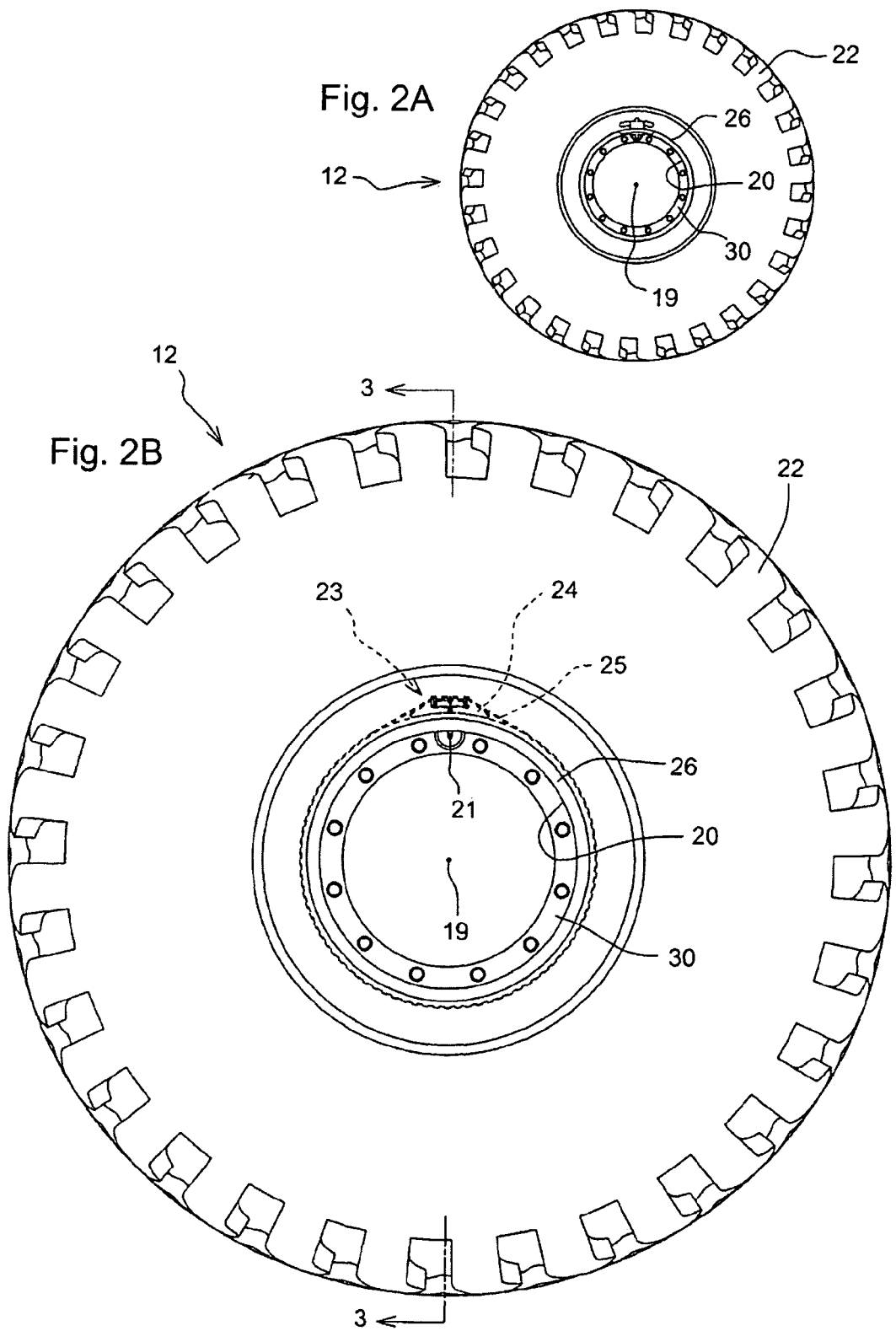
FIG. 2A is an elevational view of one of the wheel assemblies.
FIG. 2B is an elevational view of the wheel assembly of FIG. 2A, with portions broken away to show in phantom a sensor mount for mounting a tire condition sensor unit inside the wheel assembly.
Figure 3:
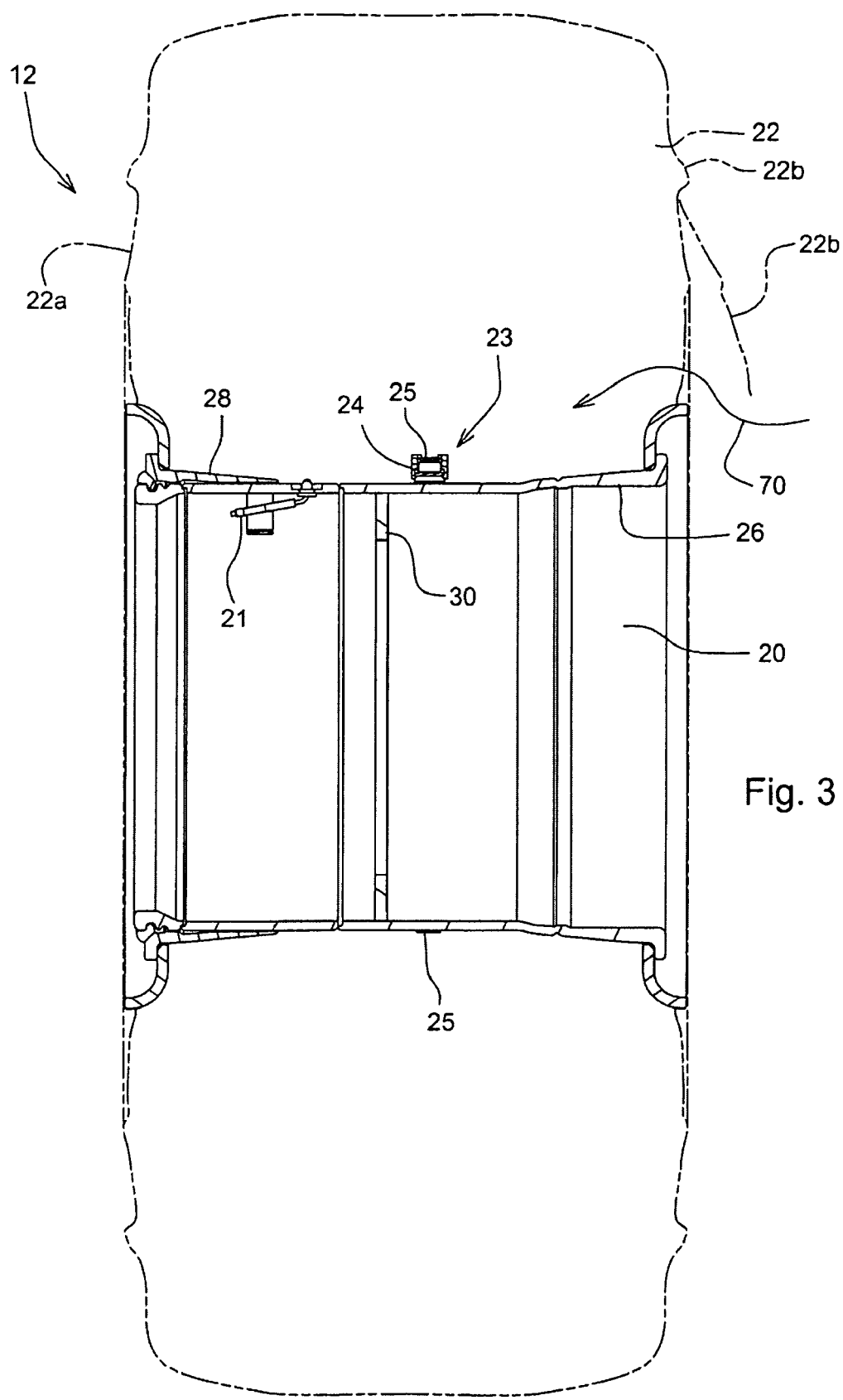
FIG. 3 is a sectional view taken along lines 3-3 of FIG. 2 showing the sensor unit mounted to an outside diameter surface of a rim of a wheel of the wheel assembly in a desired circumferential mounting location relative to the wheel using an endless loop self-tightening device of the mount positioned around the wheel, the tire of the wheel assembly being shown diagrammatically.

Referring to FIGS. 2 and 3, there is shown one of the wheel assemblies 12, exemplary of each wheel assembly 12 having a sensor unit 14 (FIGS. 6 and 7). As a frame of reference, terms such as "circumferential" and "radial," and their variants, are relative to the axis of rotation 19 of the wheel assembly 12 (FIG. 2).

The wheel assembly 12 includes a wheel 20, a tire 22 mounted to the wheel 20, a tire condition sensor unit 14, and a sensor mount 23 mounting the sensor unit 14 to an outside diameter surface 28 of a rim 26 of the wheel 20 in a desired circumferential mounting location relative to the wheel 20. The wheel 20, with its rim 26, may be made of any suitable wheel material, such as, for example, steel. Alternatively, the wheel 20, with its rim 26, may be an aluminum-type wheel, similar to on-highway trucks.

The tire 22 is shown diagrammatically in FIG. 3. It is to be appreciated that the side walls 22a, 22b of the tire 22 may seat against the rim 26 of the wheel 26 in any suitable manner. For example, the side walls 22a, 22b may extend along the inside of the flanges of the rim 26 such that the beads seat at the base of the flanges.

The mount 23 includes a carrier 24 and an endless loop self-tightening device 25. The carrier 24 carries the sensor unit 14. The self-tightening device 25 is positioned around the rim 26 of the wheel 20 on the outer diameter surface 28 thereof and mounts the carrier 24 and the sensor unit 14 carried thereby to the outside diameter surface 28 in a desired circumferential mounting location relative to the wheel 20 (e.g., near the valve stem 21). The self-tightening device 25 thus secures the sensor unit 14 to the surface 28 in the desired circumferential mounting location. The sensor unit 14 is mounted on the side of the rim 26 radially opposite the hub 30 of the wheel 20 (FIG. 3).

The mount 23 may also include adhesive in the form of, for example, a double-coated adhesive tape 32 adhered to the outside diameter surface 28 of the rim 26 and the carrier 24, further securing the sensor unit 14 to the wheel 20. It is "double-coated" in the sense that there is an adhesive coating on both sides of the tape substrate. An example of such a tape is 3M™ double-coated urethane foam tape 4008 available from 3M Company of St. Paul, Minn.

The self-tightening device 25 may take a variety of forms. For example, in the illustrated embodiment, the self-tightening device 25 is a stretchable, elastic band made of rubber, or reinforced rubber, that is formulated to resist nitrogen penetration and meet the thermal requirements for the tire application. In an articulated dump truck application, the elastic rubber would be, for example, EPDM (i.e., ethylene propylene diene M-class rubber), and the thermal requirements would be from −50° F. to 210° F. The band is shaped, for example, as a flat strip.

In other embodiments, the self-tightening device 25 may be a stretchable cord such as a bungee cord, a constant-torque available from Breeze Industrial Products Corporation of Saltsburg, Pa., a long extension coil spring, or the like, to name but a few alternatives.

Referring to FIGS. 4-8, the carrier 24 includes a base 34 and a retainer 36 detachably secured to the base 34 and cooperating with the base 34 to capture the sensor unit 14 therebetween. Each of the base 34 and the retainer 36 is a monolithic structure (i.e., a single-piece component) and is made of, for example, a polymer, such as, for example, polycarbonate.

The base 34 comprises two ramps 38 and an intermediate portion 40 interconnecting the two ramps 38. The two ramps 38 and the intermediate portion 40 cooperate to define a recessed portion 42 between the two ramps 38. The tape 32 is adhered to the outer diameter surface 28 of the rim 26 and the radial bottom 44 of the base 34.

The retainer 36 comprises a cover 46 and a quick connector 48. The cover 46 partially covers the sensor unit 14 such that the cover 46 defines an opening 50 exposing the operational portion 51 (FIGS. 7-9) of the sensor unit 14 to conditions inside the tire 22. The cover 46 and the sensor unit 14 are positioned at least partially within the recessed portion 42 between the ramps 38, with the retainer 36 extending outside the recessed portion 42 to receive the self-tightening device 25.

The quick connector 48 comprises two latch fingers 52 cantilevered to and extending radially inwardly from opposite sides of the cover 46. As shown best in FIG. 8, each latch finger 52 comprises a barb 54 received within a barb-receiving portion 56 formed in the radial bottom 44 of the base 34.

The carrier 24 may be adapted to receive the self-tightening device 25. As shown best in FIG. 6, each ramp 38 comprises a ramp channel 57 defined between parallel curbs 58 on opposite sides of the ramp 38. As shown best in FIG. 7, at each end of the cover 46, the cover 46 comprises two tabs 59 opposed to and spaced apart from one another and a shelf 60 positioned radially inwardly from the two tabs 59 so as to cooperate with the two tabs 59 to define a cover channel 62 therebetween. Each of the two cover channels 62 is adapted to receive the self-tightening device 25. As such, the self-tightening device 25 extends through the cover channels 62.

Figure 4:
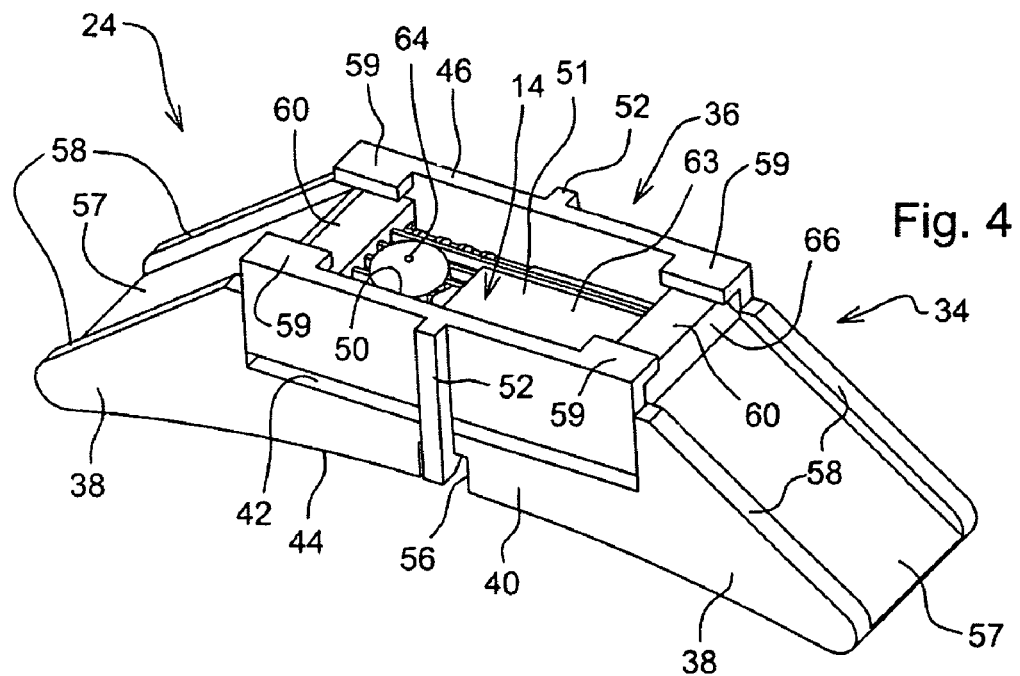
FIG. 4 is a perspective view showing the sensor unit carried by a carrier of the mount.
Figure 5:
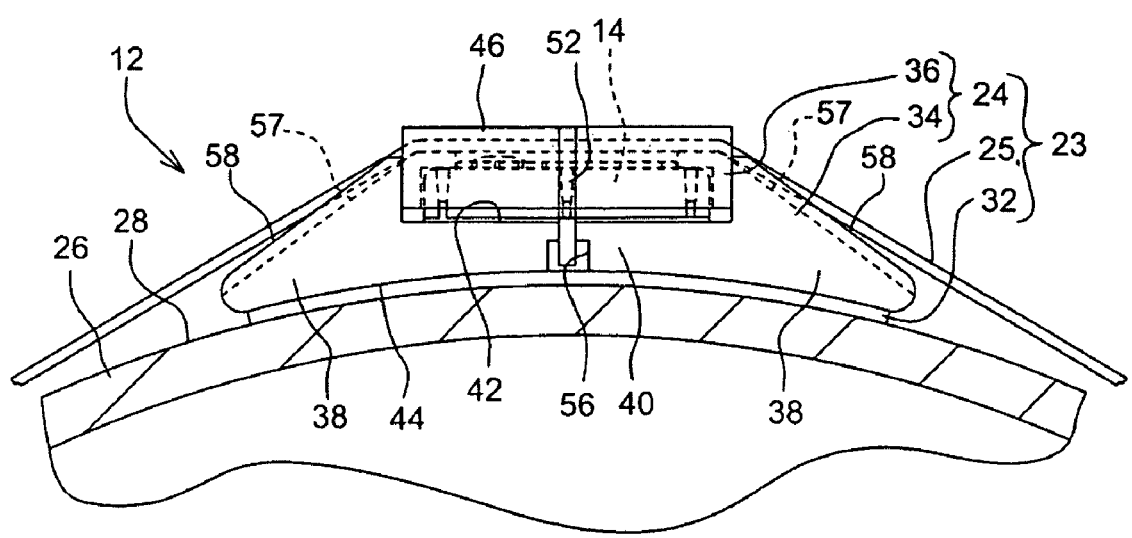
FIG. 5 is an enlarged elevational view showing the self-tightening device, in the form of, for example, an elastic band, extending radially over the carrier carrying the sensor unit.

The ramp channels 57 may be adapted to receive the self-tightening device 25. In such a case, the ramps 38 may be angled so that the self-tightening device 25 would extend through the ramp channels 57 or at least a portion thereof, such as, for example, the upper portion of the ramp channels 57 (see FIG. 7), in addition to the cover channels 62, helping to hold the carrier 24 in place. The curbs 58 would inhibit movement of the self-tightening device 14 off the ramps 38. Each shelf 60 includes a chamfer 66 which may be angled at the same or similar angle as the adjacent ramp 38, in order to facilitate transition of the self-tightening device 25 onto that ramp 38. The chamfers 66 are illustratively angled at the same angle as the respective ramps 38, as shown in FIGS. 4 and 7.

In so doing, the self-tightening device 25 extends radially over the sensor 14. There is a radial air gap 66 (FIGS. 7 and 8) defined between the sensor unit 14 and the self-tightening device 25, allowing exposure of the operational portion 52 of the sensor unit 14 to conditions inside the tire 22.

The self-tightening device 25 facilitates assembly of the wheel assembly 12. During this process, the tire 22 is partially mounted onto the rim 26 of the wheel 20. In so doing, one side wall 22a of the tire 22 is urged over and onto the rim 26, while the other side wall 22b remains uninstalled. The retainer 36 is attached to the base 34 using the latch fingers 52, with the sensor unit 14 captured between the retainer 36 and the base 34 inside the cover 46 within the recessed portion 42 between the ramps 38. The tape 32 is affixed to the radial bottom 44 of the base 34.

This sub-assembly of the sensor unit 14, carrier 24, and tape 32 is then mounted to the rim surface 28. The sub-assembly is inserted under the uninstalled side wall 22b of the tire 22 into the interior region of the tire 22, in the direction of arrow 70 in FIG. 3, and initially mounted to the rim surface 28 in a desired circumferential mounting location (e.g., near the valve stem 21 so that it can be found readily during calibration) using the tape 32 by affixing the tape 32 to the rim surface 28. The rim surface 28 would be prepared for receipt of the adhesive tape 32 prior to attachment of the tape 32. More particularly, the rim surface 28 would preferably be painted and needs to be wiped clean and free from rust or heavy oxide prior to attachment of the tape 32 thereto. Alternatively, the rim surface 32 may not be painted, but needs to be wiped clean and free from rust or heavy oxide prior to attachment of the tape 32.

The self-tightening device 25 is inserted under the uninstalled side wall 22b of the tire 22 into the interior region of the tire 22 in the direction of arrow 70 of FIG. 3 and stretched and fitted around the rim 26. It is attached to the base 34 and retainer 36 before the sub-assembly is inserted under the uninstalled tire side wall 22b, or after the sub-assembly has already been affixed to the rim surface 28. In either case, in so attaching the self-tightening device 25, the self-tightening device is routed through the ramp channels 57 and the cover channels 62. The self-tightening device 25 may thus be inserted with the sub-assembly while attached thereto or after insertion of the sub-assembly. Once installed, the self-tightening device 25 extends radially over the sensor unit 14 and the carrier 24 and is positioned around the rim 26, thereby mounting the sensor unit 14 to the surface 28 in the desired circumferential mounting location. The remaining tire side wall 22b is then installed onto the rim 26.

The self-tightening device 25 holds the sensor unit 14 in place, or at least very near thereto, during vibration and use of the wheel assembly 12. As such, when it comes time to calibrate the tire monitoring system 16, a person is able to find the sensor unit 14 readily. As alluded to above, the sensor unit 14 may be mounted in circumferential alignment with, or in the vicinity of, the valve stem 21 of the wheel assembly 12 or in some other location, predetermined or otherwise. Without seeing the sensor unit 14, the person can hold the communication device near such location, and successfully ping the sensor unit 14 for its identification code, for subsequent entry into and use by the tire monitoring system 16.

The sub-assembly may be configured according to different embodiments, with consideration for pressure access to the sensor unit 14. For example, in some embodiments, the tape 32 may be omitted, relying on the self-tightening device 25 to secure the carrier 24 and the sensor unit 14 to the rim 26 on the surface 28. In other embodiments, the carrier 24 may be omitted, relying on the tape 32, placed on the bottom of the sensor unit 14, to secure the sensor unit 14 to the rim 26 on the surface 28.

Analytical calculations indicate that the minimum holding force required for retaining the carrier 24, in the form of the one-piece polycarbonate base 34 and one-piece polycarbonate retainer 36, and the sensor unit 14, in the form of number 201.0007 from SmarTire Systems Inc., on the rim surface 28 is five pounds force under extreme conditions. 3M™ double-coated urethane foam tape 4008 would provide 25 pounds per square inch of holding force. An elastic band of EPDM rubber would provide 10 or more pounds of holding force, depending on how it is sized. In an example, such tape is four square inches, and such band has a width of ¾ inch and a circumference of 48 inches.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

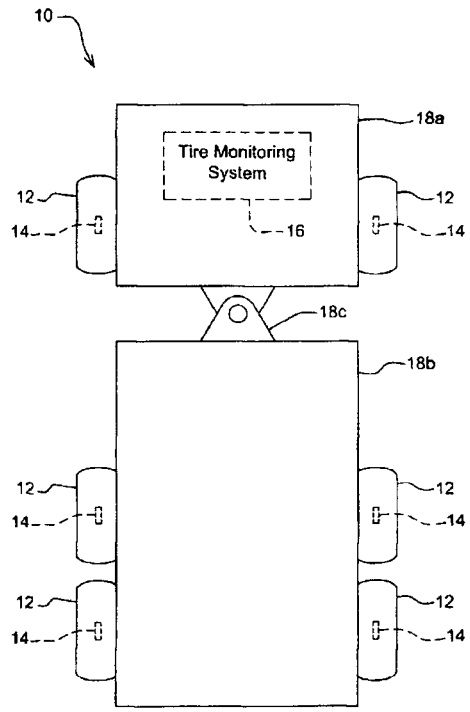

What is claimed is:

1. A wheel assembly, comprising:
a wheel,
a tire mounted to the wheel,
a tire condition sensor unit,
a sensor mount mounting the sensor unit to an outside diameter surface of a rim of the wheel in a desired circumferential mounting location relative to the wheel, the sensor mount comprising an endless loop self-tightening device positioned around the wheel,
a carrier carrying the sensor unit, the carrier comprising a base and a retainer detachably secured to the base and cooperating with the base to capture the sensor unit therebetween, and
a double-coated adhesive tape adhered to the rim and a radial bottom of the base, wherein the self-tightening device is an elastic band, the base comprises two ramps and a recessed portion defined between the two ramps, the retainer comprises a cover and a quick connector, the cover partially covers the sensor unit such that the cover defines an opening exposing the sensor unit, the cover and the sensor unit are positioned at least partially within the recessed portion between the ramps, the quick connector comprises two latch fingers cantilevered to opposite sides of the cover, each latch finger comprises a barb received within a barb-receiving portion formed in the radial bottom of the base, each ramp comprises a ramp channel, at each end of the cover the cover comprises two tabs opposed to and spaced apart from one another and a shelf positioned radially inwardly from the two tabs so as to cooperate with the two tabs to define a cover channel, and each ramp channel and each cover channel receives the self-tightening device.

2. A sensor mount for use with a wheel assembly, the wheel assembly comprising a wheel, a tire mounted to the wheel, and a tire condition sensor unit, the sensor mount adapted to mount the sensor unit to an outside diameter surface of a rim of the wheel in a desired circumferential mounting location relative to the wheel, the sensor mount comprising an endless loop self-tightening device adapted to be positioned around the wheel, a carrier, and a double-coated adhesive tape, wherein the carrier is adapted to carry the sensor unit, the carrier comprises a base and a retainer detachably secured to the base and adapted to cooperate with the base to capture the sensor unit therebetween, the double-coated adhesive tape is adhered to the rim and a radial bottom of the base, the self-tightening device is an elastic band, the base comprises two ramps and a recessed portion defined between the two ramps, the recessed portion is adapted to receive the sensor unit, the retainer comprises a cover and a quick connector, the cover is positioned at least partially within the recessed portion between the ramps to partially cover the sensor unit such that the cover defines an opening to expose the sensor unit, the quick connector comprises two latch fingers cantilevered to opposite sides of the cover, each latch finger comprises a barb received within a barb-receiving portion formed in the radial bottom of the base, each ramp comprises a ramp channel, at each end of the cover the cover comprises two tabs opposed to and spaced apart from one another and a shelf positioned radially inwardly from the two tabs so as to cooperate with the two tabs to define a cover channel, and each ramp channel and each cover channel receives the self-tightening device.

3. The wheel assembly of claim 1, wherein the self-tightening device extends radially over the sensor unit.

4. The wheel assembly of claim 3, wherein there is a radial air gap defined between the sensor unit and the self-tightening device.

* * * * *

UNITED STATES PATENT AND TRADEMARK OFFICE
CERTIFICATE OF CORRECTION

| | | |
|---|---|---|
| PATENT NO. | : 7,937,998 B2 | Page 1 of 1 |
| APPLICATION NO. | : 12/407632 | |
| DATED | : May 10, 2011 | |
| INVENTOR(S) | : William L. Carr and Carl Starkey | |

It is certified that error appears in the above-identified patent and that said Letters Patent is hereby corrected as shown below:

Claim 5 is added at column 6, line 65:

5. The wheel assembly of claim 1, wherein the self-tightening device comprises rubber.

Signed and Sealed this
Fourth Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,937,998 B2 | |
| APPLICATION NO. | : 12/407632 | |
| DATED | : May 10, 2011 | |
| INVENTOR(S) | : William L. Carr and Carl Starkey | |

It is certified that error appears in the above-identified patent and that said Letters Patent is hereby corrected as shown below:

Delete the title page and substitute therefore the attached title page showing the corrected number of claims in patent.

Claim 5 is added at column 6, line 65:

5. The wheel assembly of claim 1, wherein the self-tightening device comprises rubber.

This certificate supersedes the Certificate of Correction issued October 4, 2011.

Signed and Sealed this
Twenty-fifth Day of October, 2011

David J. Kappos
*Director of the United States Patent and Trademark Office*

(12) United States Patent
Carr et al.

(10) Patent No.: US 7,937,998 B2
(45) Date of Patent: May 10, 2011

(54) SENSOR MOUNT WITH SELF-TIGHTENING DEVICE

(75) Inventors: William L. Carr, Bettendorf, IA (US); Carl Starkey, Clinton, IA (US)

(73) Assignee: Deere & Company, Moline, IL (US)

( * ) Notice: Subject to any disclaimer, the term of this patent is extended or adjusted under 35 U.S.C. 154(b) by 159 days.

(21) Appl. No.: 12/407,632

(22) Filed: Mar. 19, 2009

(65) Prior Publication Data
US 2010/0238011 A1 Sep. 23, 2010

(51) Int. Cl.
*G01M 17/02* (2006.01)
(52) U.S. Cl. .............................................. 73/146
(58) Field of Classification Search .................. None
See application file for complete search history.

(56) References Cited

U.S. PATENT DOCUMENTS

| | | |
|---|---|---|
| 4,235,184 A | 11/1980 | Schiavone |
| 4,487,154 A | 12/1984 | Daly et al. |
| 4,510,484 A | 4/1985 | Snyder |
| 4,783,993 A | 11/1988 | Lothar et al. |
| 4,954,677 A | 9/1990 | Alberter et al. |
| 5,035,137 A | 7/1991 | Burkard et al. |
| 5,063,774 A | 11/1991 | Burkard et al. |
| 5,559,484 A | 9/1996 | Nowicki et al. |
| 5,844,131 A | 12/1998 | Gabelmann et al. |
| 6,055,855 A | 5/2000 | Straub |
| 6,549,125 B2 | 4/2003 | Nigon et al. |
| 6,655,203 B2 | 12/2003 | Hsu |
| 6,672,150 B2 | 1/2004 | Delaporte et al. |
| 6,694,807 B2 | 2/2004 | Chuang et al. |
| 6,805,000 B1 | 10/2004 | Sheikh-Bahaie |
| 7,082,817 B1 | 8/2006 | Yu et al. |

OTHER PUBLICATIONS

Background Information (2 pages)(Prior Art).
Bendix SmartWave Tire Pressure Monitoring System (81 pages)(prior art).
Bridgestone Wireless Tire Pressure Monitoring System (1 page)(Jul. 2008).
Kilometer Magazine Forums (29 pages)(2005-2006).
Drawings of Tire Condition Sensor Unit (1 page)(prior art).

*Primary Examiner* — Andre J Allen

(57) ABSTRACT

A wheel assembly comprises a wheel, a tire mounted to the wheel, a tire condition sensor unit, and a sensor mount. The sensor mount mounts the sensor unit to an outside diameter surface of a rim of the wheel in a desired circumferential mounting location relative to the wheel, and comprises an endless loop self-tightening device positioned around the wheel.

5 Claims, 5 Drawing Sheets